(12) United States Patent
Itoh

(10) Patent No.: US 6,344,127 B1
(45) Date of Patent: Feb. 5, 2002

(54) METHOD FOR PREPARING PHOTOCATALYTIC MATERIAL

(76) Inventor: Yoshihisa Itoh, 998-22, Suenoguchi-cho, Imakoji-dori Hichihonmatsu-Nishiiru, Kamigyo-ku, Kyoto (JP)

( * ) Notice: Subject to any disclaimer, the term of this patent is extended or adjusted under 35 U.S.C. 154(b) by 0 days.

(21) Appl. No.: 09/533,870

(22) Filed: Mar. 24, 2000

(30) Foreign Application Priority Data

Mar. 25, 1999 (JP) .......................................... 11-082082

(51) Int. Cl.⁷ .............................................. C25D 11/34
(52) U.S. Cl. ...................... 205/171; 205/212; 205/224; 205/229; 205/322
(58) Field of Search ................................. 205/212, 224, 205/229, 322, 171

(56) References Cited

U.S. PATENT DOCUMENTS

| | | | |
|---|---|---|---|
| 5,221,459 A | * | 6/1993 | Okano et al. ................ 205/322 |
| 5,382,347 A | * | 1/1995 | Yahalom ....................... 205/50 |
| 5,595,638 A | * | 1/1997 | Konuma et al. ............... 205/96 |
| 6,197,184 B1 | * | 3/2001 | Hemphill et al. ............ 205/333 |

* cited by examiner

*Primary Examiner*—Kathryn Gorgos
*Assistant Examiner*—William T. Leader
(74) *Attorney, Agent, or Firm*—Armstrong, Westerman, Hattori, McLeland & Naughton, LLP

(57) ABSTRACT

The object of the invention is to provide a method for producing a photocatalytic material which consists of a titanium oxide, exhibits a higher photocatalytic activity and has excellent appearances. The above object is attained by the provision of a method for preparing a photo catalytic material by oxidizing the surface of a substrate consisting of titanium or a titanium alloy, the method comprising a step of anodizing the substrate in an electrolyte containing an organic acid and/or a salt of the organic acid and a step of further oxidizing the anodized substrate in an atmosphere.

11 Claims, 5 Drawing Sheets

METHOD FOR PREPARING PHOTOCATALYTIC MATERIAL

BACKGROUND OF THE INVENTION

1. Field of the Invention

The present invention relates to a photocatalytic material consisting of titanium or a titanium alloy coated with an oxide film having a photocatalytic activity.

2. Background Art

A titanium oxide of an anatase type has a photocatalytic activity, which is utilized for decomposing harmful substances such as nitrogen oxides ($NO_x$) or bacteria. Such a photocatalytic material is also excellent in appearances so as to be used for decorative applications. In recent years, there have been great demands for improving the photo catalytic materials to have a higher photocatalytic activity and more excellent appearances.

One way to produce a photocatalytic material is to anodize a substrate consisting of titanium or a titanium alloy in an electrolyte. For instance, there has been known method comprising a step of anodizing a titanium substrate in an aqueous phosphoric acid solution for covering the surface thereof with an anatase type titanium oxide, which is described in Japanese laid Patent Application (JP-A) No.08-246192 and No. H10-121266. These anodization methods however may yield the anatase type titanium oxide poorly. Therefore, the treated substrate further has to be coated on its surface with anther active anatase type titanium oxide for providing a sufficient photocatalytic activity.

SUMMARY OF THE INVENTION

In light of the above situation, it is an object of the present invention to reexamine the prior art methods to provide a method for producing a photocatalytic material comprising a titanium oxide, the photo catalytic material having a higher photo catalytic activity and more excellent appearances.

The inventor of the present invention has repeated various investigations to solve the above problem. As a result, the inventor has found that the above problem can be solved by a method for preparing a photocatalytic material according to the present invention. The method comprises a step of oxidizing the surface of a substrate consisting of titanium or a titanium alloy. This method also comprises steps of anodizing the substrate in an electrolyte containing an organic acid and/or any salt of the organic acid, and oxidizing the anodized substrate in an atmosphere.

This method may further comprise a step of immersing the substrate in an aqueous solution containing a peroxide before anodizing the substrate.

The present invention differs from current anodization methods in the point that a substrate is anodized in an electrolyte containing an organic acid or salt thereof, then oxidized in an atmosphere. The present invention also differs from current anodization methods in the point that the substrate is in advance pretreated in an aqueous solution containing a peroxide.

PREFERRED EMBODIMENTS OF THE INVENTION

Figure 1:
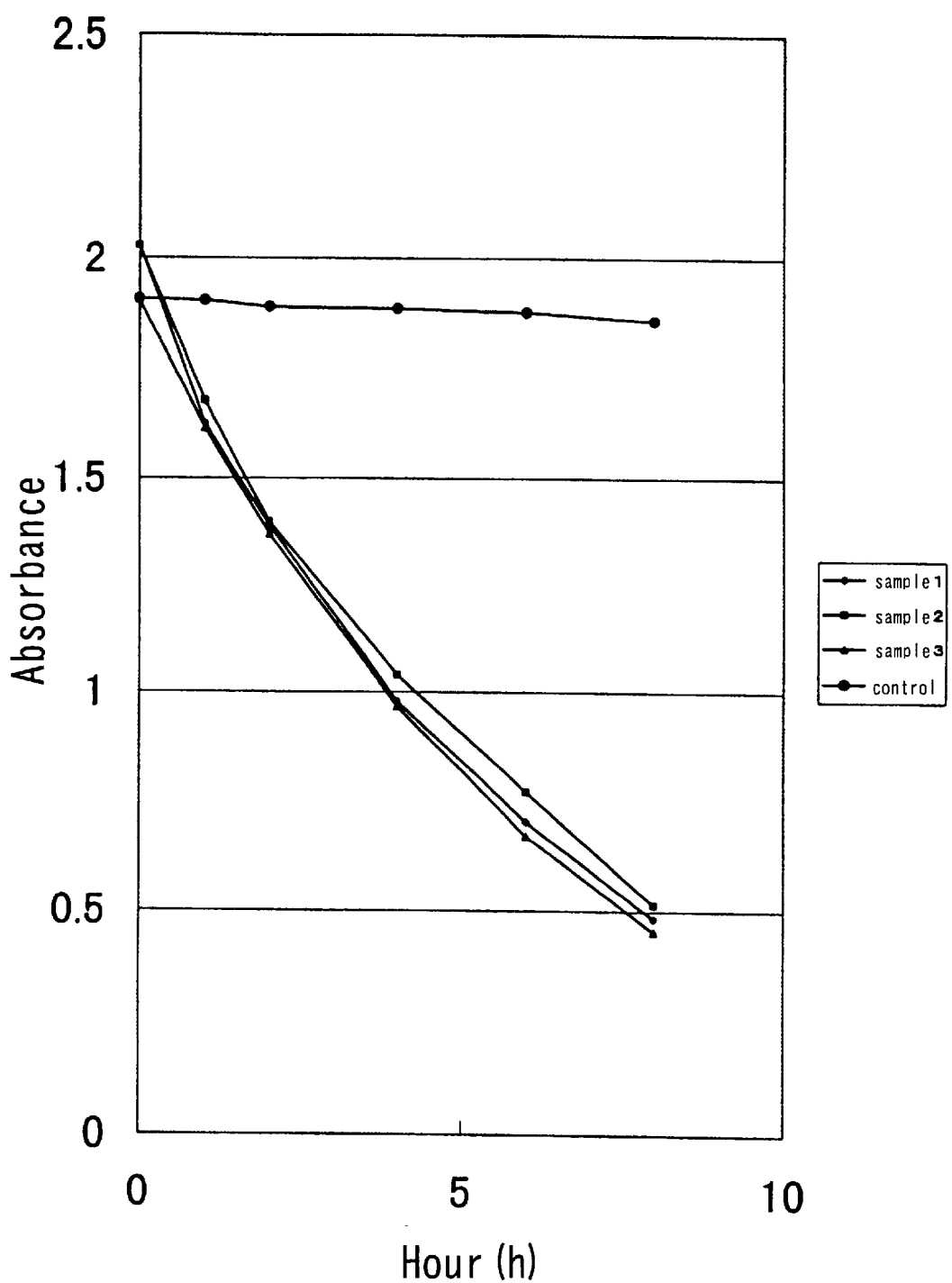
FIG. 1 is a graph showing the photocatalytic activity of prepared samples according to the present invention.

The present invention will be clarified by following detail description.

Substrate

A substrate used in the present invention consists of titanium or a titanium alloy. It is preferable that the purity of titanium used in the present invention is 99% and more. It is also preferable that the titanium alloy includes at least one metal selected from the group consisting of elements of groups 5A, 6A, 7A, 8, 1B, 2B, 3B and 4B in the periodic table. Especially, the titanium alloy used in the present invention may preferably include platinum, gold, tin, palladium, ruthenium, nickel, cobalt, chromium, molybdenum, aluminum, vanadium and zirconium. Examples of desirable titanium alloys are titanium-aluminum-tin alloy (e.g., Ti-5Al-2.5Sn), titanium-aluminum-vanadium alloy (e.g., Ti-6Al-4V) and titanium-molybdenum-zirconium alloy (e.g., Ti-15Mo-5Zr).

The above mentioned substrate may have various forms. The starting substrate may have a form of plate, rod or block. A sponge-like (porous) substrates may also be used in the present invention.

It is desirable that the surface of the above mentioned substrate may be cleaned by an acid for removing an oxide film formed or a stain stuck thereon before being anodized as described hereinafter. This acid cleaning helps a uniform and firm titanium oxide film to form on the surface of the substrate. This acid cleaning may be performed by a well-known method. For instance, the substrate is immersed in an acid solution such as an aqueous solution containing 5 to 10% by weight of hydrogen fluoride.

The acid cleaned substrate is sufficiently washed out with water followed by that it is transferred to the next step described hereinafter.

(Pretreatment Step)

According to the present invention, it is preferable that the substrate is immersed in a pretreating solution containing a peroxide for a predetermined period of time. The immersion of the substrate into the pretreating solution may outstandingly improve the appearances and the photocatalytic activity of the resulting product.

In the present invention, well-known inorganic peroxides and organic peroxides are used for the immersion. Among these peroxides, hydrogen peroxide is preferably used. A preferable hydrogen peroxide is used to be solved into water or an aqueous solution. The obtained solution may contain hydrogen peroxide having a concentration of 0.1 to 20% by weight, more preferably 2 to 15% by weight and most preferably 3 to 10% by weight. It is considered that immersion of the substrate into the pretreating solution containing hydrogen peroxide may make a titanium peroxide film on the surface of the substrate, which helps to improve the appearances and photocatalytic activity of the obtained product.

The substrate may be immersed in the pretreating solution for 1 to 100 hours, more preferably 3 to 72 hours and most preferably 5 to 48 hours, not to be limited.

(Anodization Step)

The substrate pretreated as required is then anodized.

According to the present invention, an electrolyte containing an organic acids or salts thereof is used for anodizing the substrate.

Such an electrolyte containing an organic acid or salt thereof may easily and surely make a titanium oxide film have a high photocatalytic activity.

According to the present invention, various types of organic acid and salt thereof such as aliphatic organic acids, salts thereof, aromatic organic acids and salts thereof may be used. They are used alone or in combination of each other.

Examples of aliphatic organic acids or salts thereof may be include tartaric acid, acetic acid, formic acid, citric acid, malic acid, lactic acid, succinic acid, gluconic acid and fumaric acid, and alkali metal salts and alkali earth metal salts thereof. Among these acids and salts, tartaric acid, citric acid, malic acid, succinic acid, gluconic acid and fumaric acid, and sodium salts thereof are preferably used. Especially, sodium salts of tartaric acid, citric acid, malic acid, succinic acid or gluconic acid are preferably used.

Examples of aromatic organic acids or salts thereof may include benzenesulfonic acid, toluenesulfonic acid, naphthalenesulfonic acid and cresolsulfonic acid, and alkali metal salts or alkali earth metal salts thereof.

The above mentioned organic acids and salts thereof is dissolved in an aqueous solvent, especially water in a concentration of 0.1 to 15% by weight, more preferably 0.3 to 10% by weight and most preferably 0.5 to 5% by weight for obtaining the electrolyte, not to be limited.

The electrolyte used in the present invention may further include a pH regulator in addition to the above mentioned organic acid or salt thereof to promote ion conductivity during the anodization. Examples of the pH regulator preferably used in the present invention may include sulfuric acid, hydrochloric acid and sodium hydroxide. Such a pH regulator is contained in the electrolyte in a concentration of 0.1 to 15% by weight, more preferably 0.3 to 10% by weight and most preferably 0.5 to 5% by weight.

According to the present invention, it is regarded as one step of anodization that a pair of an anode (substrate) and a cathode is disposed in the electrolyte for applying a voltage between these electrodes up to a determined voltage to be kept for a period, followed by that the applied voltage is removed.

The profile in the anodization may comprise a step of raising voltage stepwise or continuously at a rate of preferably 0.01 to 1 V/second, more preferably 0.05 to 0.3 V/second and most preferably 0.1 to 0.3 V/second, up to a peak voltage of preferably 10 to 200 V, more preferably 30 to 180 V and most preferably 50 to 150 V. The voltage may be kept for 50 seconds and more, and more preferably 100 seconds and more. Thereafter, the applied voltage may be removed instantly or gradiently. The electrolyte preferably has a temperature of 20 to 50° C.

The anodized substrate is transferred to the next step after it is sufficiently washed with water.

Oxidation Step in an Atmosphere

The substrate anodized in the above manner is then oxidized in an atmosphere. Although no particular limitation is imposed on the condition of the atmospheric oxidation, the substrate is preferably heated at 100 to 750° C., more preferably 350 to 650° C. and most preferably 500 to 600° C. The substrate may be preferably oxidized for 0.2 to 5 hours, more preferably 0.5 to 3 hours and most preferably 0.5 to 2 hours in an atmosphere.

In the present invention, the substrate is anodized before being oxidized in the atmospherer so that the substrate has an anatase type titanium oxide film formed surely on the surface of the substrate to acquire a sufficient photocatalytic activity.

According to the present invention, at least one cycle of the anodization followed by the atmospheric oxidation may be preformed. However, either one or both of the anodization step and the atmospheric oxidation step may be repeated.

Also, as adjusting the kind or the shape of the substrate, pretreating solution, the anodization and the atmospheric oxidation conditions, various photocatalytic material having a better performance can be obtained.

The obtained photocatalytic material may have the titanium oxide film on the surface thereof, having a thickness of 100 to 10000 angstrom, preferably 200 to 6000 angstrom, and most preferably 300 to 5000 angstrom.

EXAMPLES

Followings are more detail descriptions about the present invention to illustrate examples.

Example 1

A pure titanium substrate having a width of 24 mm, a length of 45 mm, and a thickness of 1 mm is prepared for being treated according to the present invention. This substrate is washed with an acid solution in advance.

The substrate was immersed in an aqueous solution including hydrogen peroxide in a concentration of 3% at a room temperature for 24 hours.

Following by the above pretreatment, the substrate was anodized in an electrolyte including tartaric acid in a concentration of 1% by weight, sulfuric acid in a concentration of 1% by weight and hydrogen peroxide in a concentration of 2% by weight.

The anodization step consists of a profile in which a voltage was applied stepwise at a rate of 0.24 V every 1.5 second up to a peak voltage of 100 V to be kept for 100 seconds, then switched off. In the example 1, twice anodization step was repeated with including wash and dry of the substrate between the steps.

Then, the substrate was oxidized in an atmosphere at 500° C. for 60 minutes to obtain a sample 1.

The conditions in example 1 for preparing the sample 1 are listed in Table 1. In Table 1, "Anodization (100 V)" means that the anodization is performed at a peak voltage of 100 V, and "Atmospheric oxidation (500° C.)" means that the atmospheric oxidation is performed at a temperature of 500° C.

Examples 2 and 3

Samples 2 or 3 was obtained in the same manner as described in Example 1 except using an electrolyte having another composition. The conditions for the sample 2 or 3 are also listed in Table 1.

Examples 4 and 5

Samples 4 or 5 was obtained in the same manner as in Example 1 except adopting another oxidation condition. The conditions for the sample 4 and 5 are also listed in Table 1.

Examples 6 and 7

Samples 6 or 7 was obtained in the same manner as in Example 1 except prolonging the piriod for pretreating or omitting the pretreating. The conditions for the sample 6 and 7 are also listed in Table 1.

Example 8

Sample 8 was obtained in the same manner described in Example 1 except chainging the peak voltage in the anodization. The conditions for the sample 8 are also listed in Table 1.

Comparative Examples 1 and 2

Samples 9 or 10 was obtained in the same manner described in Example 1 except using another electrolyte having a composition without the scope of the present invention. The conditions for the sample 9 or 10 are also listed in Table 1.

invention may reduce more rapidly than that of samples 9 and 10. It is considered that the samples prepared according to the present invention may have a higher photocatalytic activity to decompose methylene blue rapidly.

Figure 2:
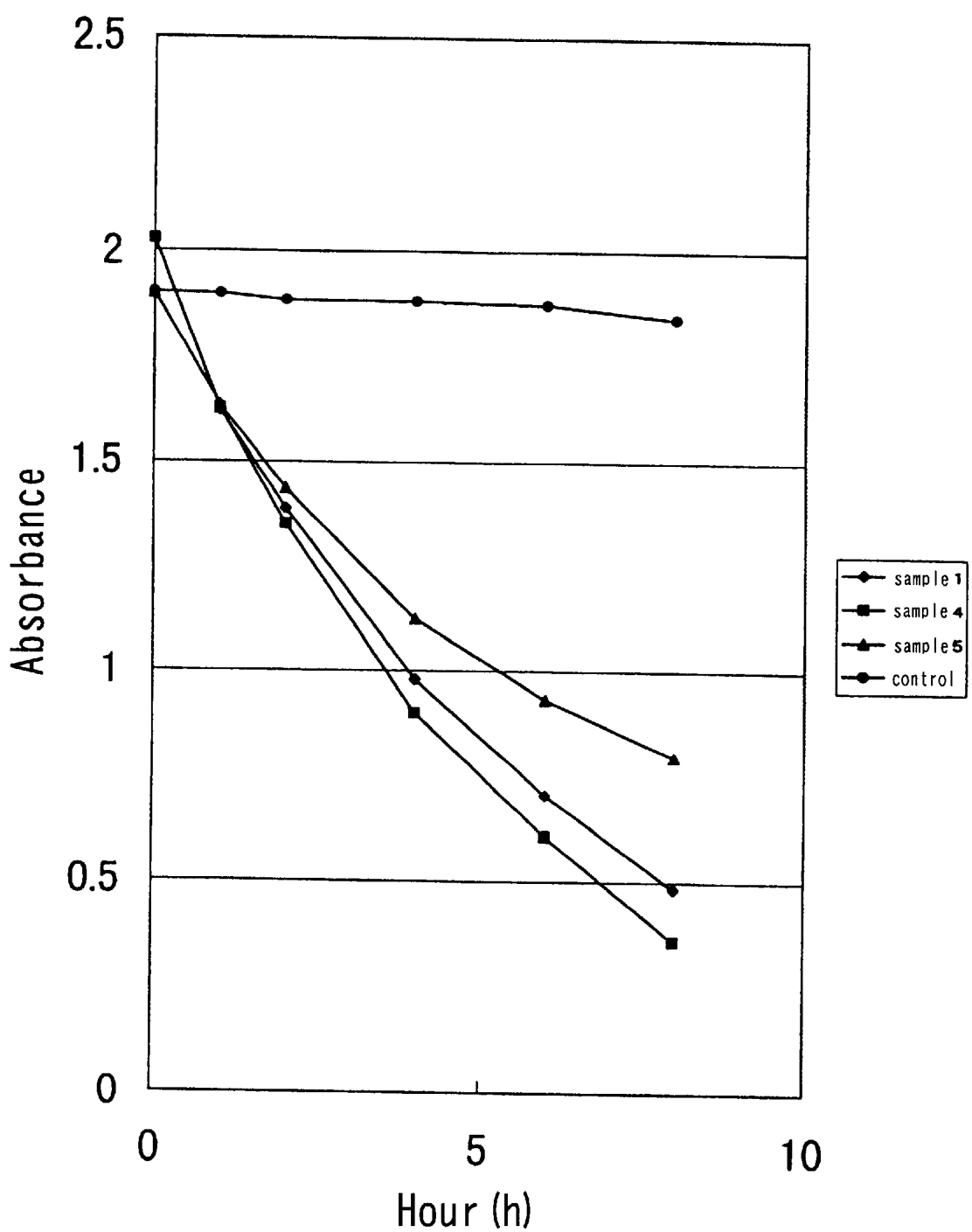
FIG. 2 is a graph showing the photocatalytic activity of prepared samples according to the present invention.

FIG. 2 clarifies that "anodization/anodization/atmospheric oxidation" for the sample 1 or "anodization/atmospheric oxidation/anodization/atmospheric oxidation" for the sample is more effective in improving a photocatalytic activity than "anodization/atmos pheric oxidation" for the sample 5. It is considered that plural repetitions of anodization and atmospheric oxidation may effectively improve the photocatalytic activity.

Figure 3:
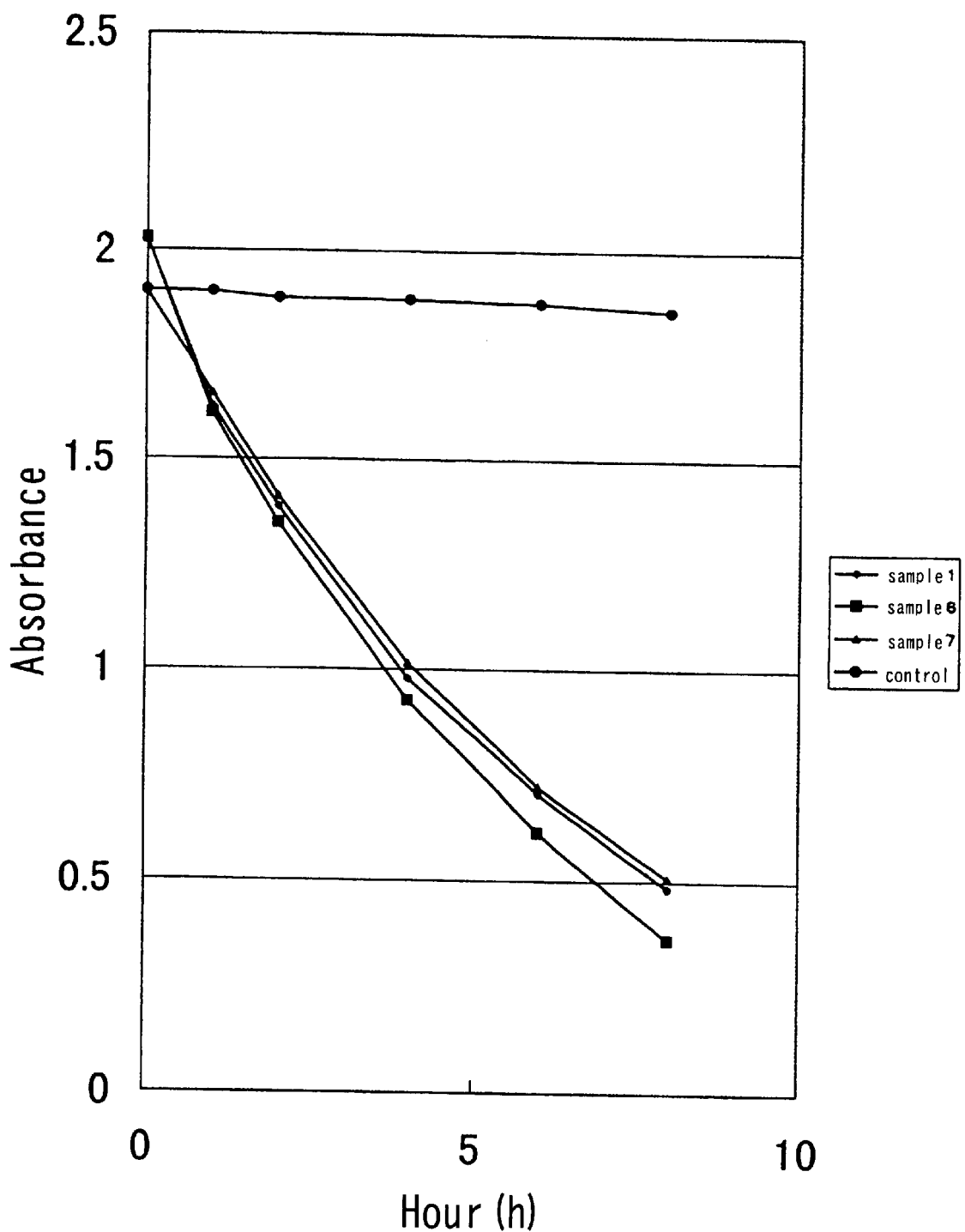
FIG. 3 is a graph showing the photocatalytic activity of prepared samples according to the present invention.

FIG. 3 clarifies that the sample 6 prepared by immersed in a pretreating solution for 100 hours according to the present invention has a more greatly improved photo catalytic activity than the sample 1 prepared by immersed in a

TABLE 1

| | | Condition of preparation of samples | | | |
|---|---|---|---|---|---|
| Sample No | With or without pretreatment/ Treating time (h) | Compositions of electrolytes | Oxidation condition | | |
| Example | | | | | |
| Sample 1 | With/24 | 1% sodium tartrate 1% sulfuric acid 2% hydrogen peroxide | Anodization (100 V) Atmospheric oxidation (500° C.) | → Anodization (100 V) | → |
| Sample 2 | With/24 | 1% sodium hydroxide 1% tartaric acid | Anodization (100 V) Atmospheric oxidation (500° C.) | → Anodization (100 V) | → |
| Sample 3 | With/24 | 1% cresolsulfonic acid 1% sulfuric acid 2% hydrogen peroxide | Anodization (100 V) Atmospheric oxidation (500° C.) | → Anodization (100 V) | → |
| Sample 4 | With/24 | 1% sodium tartrate 1% sulfuric acid 2% hydrogen peroxide | Anodization (100 V) Anodization (100 V) | → Atmospheric oxidation (500° C.) → Atmospheric oxidation (500° C.) | → → |
| Sample 5 | With/24 | 1% sodium tartrate 1% sulfuric acid 2% hydrogen peroxide | Anodization (100 V) | → Atmospheric oxidation (500° C.) | |
| Sample 6 | With/100 | 1% sodium tartrate 1% sulfuric acid 2% hydrogen peroxide | Anodization (100 V) Atmospheric oxidation (500° C.) | → Anodization (100 V) | → |
| Sample 7 | Without/— | 1% sodium tartrate 1% sulfuric acid 2% hydrogen peroxide | Anodization (100 V) Atmospheric oxidation (500° C.) | → Anodization (100 V) | → |
| Sample 8 | With/24 | 1% sodium tartrate 1% sulfuric acid 2% hydrogen peroxide | Anodization (50 V) Atmospheric oxidation (500° C.) | → Anodization (50 V) | → |
| Comparative Example | | | | | |
| Sample 9 | Without/— | 1% phosphoric acid | Anodization (100 V) | → Atmospheric oxidation (300° C.) | |
| Sample 10 | Without/— | 3% sulfuric acid | Anodization (100 V) | | |

(Decoloring test for Colored Water)

11 beakers charged with colored water containing 10 ppm of methylene blue were prepared. 10 beakers were used for that the samples 1 to 10 were immersed respectively. The remainder one beaker was used as a control. These beakers were lit up with two 15 W-black lights. The absorbance of the colored water was measured at predetermined intervals. FIG. 1 to FIG. 5 show graphs showing the absorbances obtained in the test.

FIG. 1 to FIG. 5 clarify that the absorbances of the colored water associated with samples 1 to 8 according to the present pretreating solution for 24 hours or the sample 7 prepared without pretreatment. Also, the samples 1 to 6 prepared with pretreatment has a more uniform and vivid color than the sample 7 without pretreatment. It is considered that the pretreatment according to the present invention is an effective in further improving the photocatalytic activity and the appearances of the resulting product.

Figure 4:
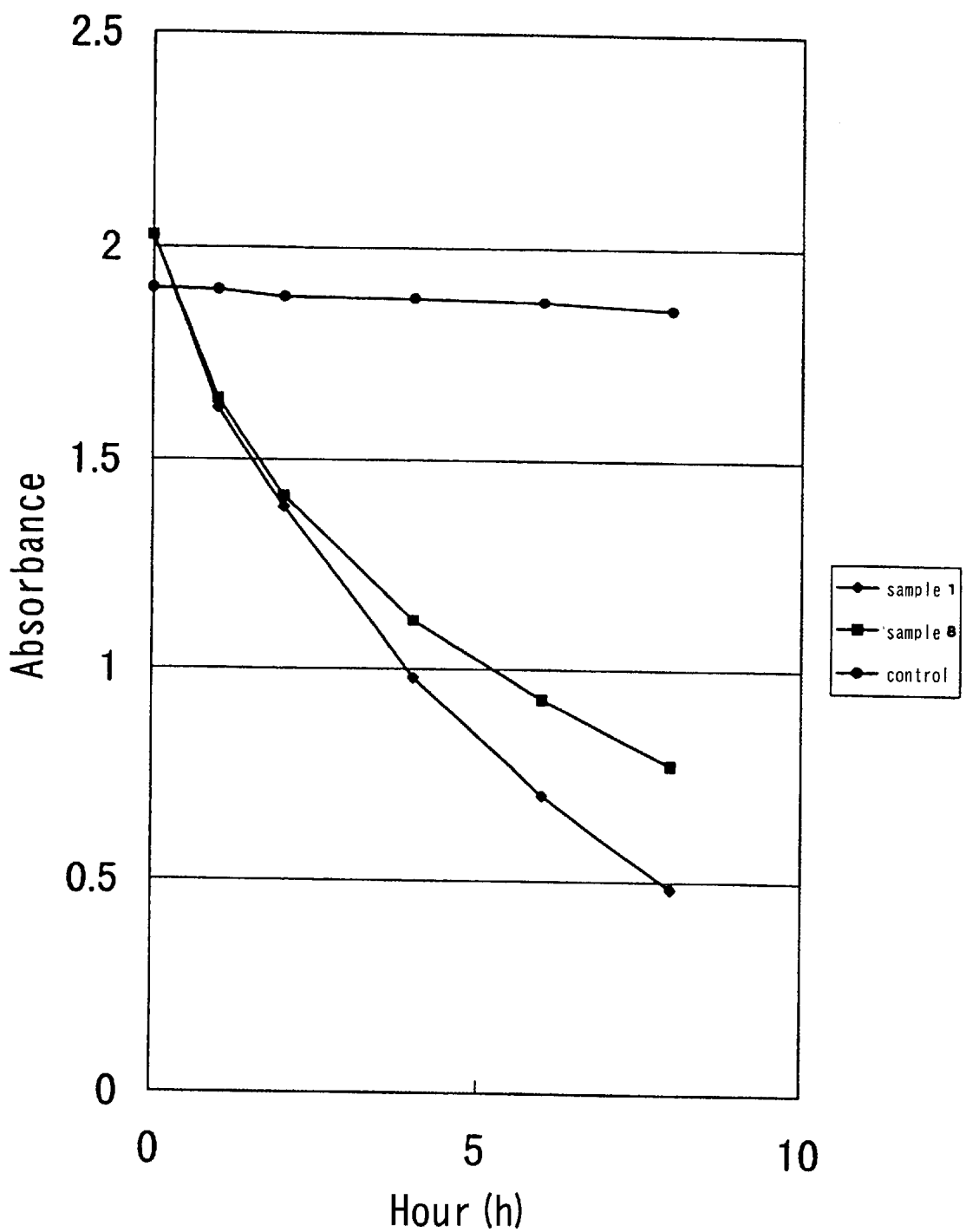
FIG. 4 is a graph showing the photocatalytic activity of prepared samples according to the present invention and prior art.
Figure 5:
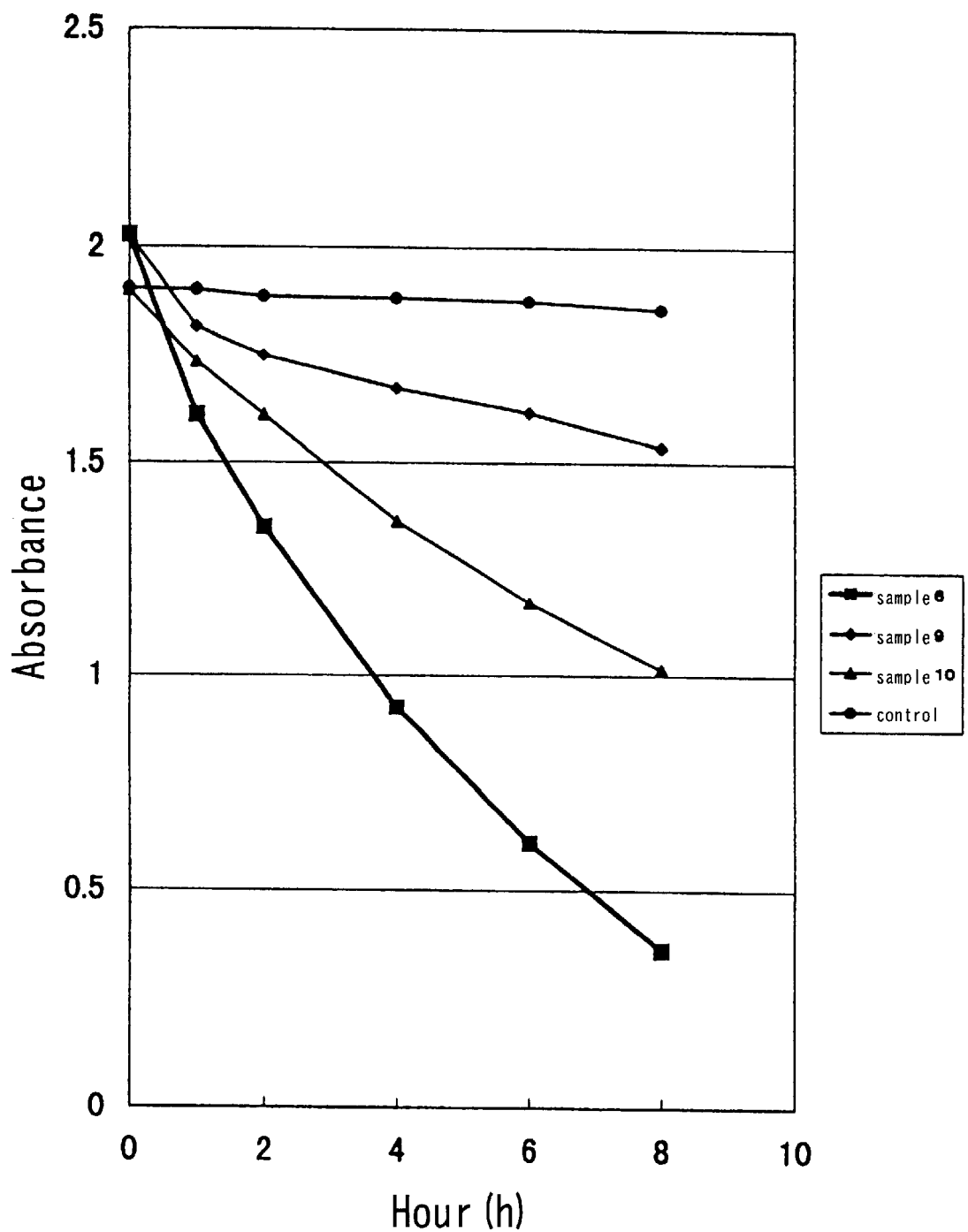
FIG. 5 is a graph showing photocatalytic activity of prepared samples according to the present invention compared to prepared samples of prior art.

FIG. 4 clarifies that the sample 1 prepared at a peak voltage of 100 V has a larger photocatalytic activity than the sample 8 prepared at a peak voltage of 50 V.

(Germicidal test)

0.1 ml of a bacterial solution containing about $10^7$ cells/ml of colibacillus (*E. coli* IFO 3301) was dripped on each of the samples 1 to 4 and an untreated titanium substrate having no titanium oxide film. Thereafter, 15 W black light was applied to the substrate from above the substrate for 30 minutes. In order to prevent the colibacillus killed by heat, the black light was placed 30 cm apart from the substrate. Then the bacterial solution on the substrate was cultured on an LB culture medium to measure the amount of colibacillus. The results are listed in Table 2.

As a consequence, the amount of colibacillus is more remarkably reduced in the case of the samples 1 to 4 according to the present invention than that of the untreated titanium substrate. It is proved that the titanium oxide substrate according to the present invention has an antibacterial activity.

TABLE 2

|  | Intake | Sample 1 | Sample 2 | Untreated substrate |
|---|---|---|---|---|
| Amount of colibacillus | $3.8 \times 10^6$ | $6.4 \times 10^4$ | $4.2 \times 10^3$ | $2.9 \times 10^6$ |

What is claimed is:

1. A method for preparing a photocatalytic material, the method comprising:
   (A) providing a substrate consisting of titanium or titanium alloy,
   (B) immersing the substrate in an acid to clean a surface thereof,
   (C) immersing the cleaned substrate in an aqueous solution of a peroxide,
   (D) applying a voltage to the substrate in an electrolyte containing an organic acid or a salt thereof to perform an anodizing step, and
   (E) oxidizing the anodized substrate in the atmosphere to perform an oxidation step.

2. A method according to claim 1, wherein the peroxide is hydrogen peroxide.

3. A method according to claim 2, wherein the hydrogen peroxide is contained in the aqueous solution at a concentration of 0.1 to 20% by weight.

4. A method according to claim 3, wherein the substrate is immersed in the aqueous solution of hydrogen peroxide for 1 to 100 hours.

5. The method of claim 1, wherein the organic acid is selected from the group consisting of tartaric acid, acetic acid, formic acid, citric acid, malic acid, lactic acid, succinic acid, gluconic acid and fumaric acid.

6. The method of claim 1, wherein the organic acid or the salt thereof is contained in the electrolyte at a concentration of 0.1 to 15% by weight.

7. The method of claim 6, wherein the electrolyte contains sodium tartarate as the organic acid salt in a concentration of 1% by weight.

8. The method of claim 1, wherein the anodizing step comprises a step of raising a voltage stepwise or continuously at a rate of 0.01 to 1 V/second up to a peak voltage of 10 to 200 V to apply the peak voltage to the substrate, a step of keeping for 50 seconds or more at the peak voltage, and a step of removing the applied voltage instantly or gradually, the electrolyte having a temperature of 20 to 50° C.

9. The method of claim 1, wherein the oxidation step comprises heating the substrate at 350 to 650° C. for 0.2 to 5 hours.

10. The method of claim 1, wherein the method comprises repeating the anodizing step before or after performing the oxidation step.

11. The method of claim 10, wherein the repeated anodizing step comprises a step of raising a voltage stepwise or continuously at a rate of 0.01 to 1 V/second up to a peak voltage of 10 to 200 V to apply the peak voltage to the substrate, a step of keeping for 50 seconds or more at the peak voltage, and a step of removing the applied voltage instantly or gradually, the electrolyte having a temperature of 20 to 50° C.

* * * * *